(12) United States Patent
Tong et al.

(10) Patent No.: US 11,927,878 B2
(45) Date of Patent: Mar. 12, 2024

(54) PROJECTION SCREEN, MANUFACTURING METHOD, AND DISPLAY SYSTEM HAVING NANOPARTICLE LAYERS

(71) Applicants: BEIJING BOE DISPLAY TECHNOLOGY CO., LTD., Beijing (CN); BOE TECHNOLOGY GROUP CO., LTD., Beijing (CN)

(72) Inventors: Guangyun Tong, Beijing (CN); Yu Zhang, Beijing (CN); Zhuolong Li, Beijing (CN); Xuefei Qin, Beijing (CN); Junning Su, Beijing (CN)

(73) Assignees: BEIJING BOE DISPLAY TECHNOLOGY CO., LTD., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 17/779,296

(22) PCT Filed: Jun. 9, 2021

(86) PCT No.: PCT/CN2021/099174
§ 371 (c)(1),
(2) Date: May 24, 2022

(87) PCT Pub. No.: WO2022/007576
PCT Pub. Date: Jan. 13, 2022

(65) Prior Publication Data
US 2022/0413375 A1    Dec. 29, 2022

(30) Foreign Application Priority Data

Jul. 6, 2020    (CN) .......................... 202010642530.1

(51) Int. Cl.
*G03B 21/62*    (2014.01)
*B05B 1/14*    (2006.01)
(Continued)

(52) U.S. Cl.
CPC ................ *G03B 21/62* (2013.01); *B05B 1/14* (2013.01); *B05B 1/20* (2013.01); *B32B 7/12* (2013.01);
(Continued)

(58) Field of Classification Search
CPC .. G03B 21/62; B05B 1/14; B05B 1/20; B05B 13/04; B32B 7/12; B32B 17/06;
(Continued)

(56) References Cited

U.S. PATENT DOCUMENTS

| | | |
|---|---|---|
| 9,971,151 B1 | 5/2018 | Marason et al. |
| 2005/0110964 A1 | 5/2005 | Bell et al. |

(Continued)

FOREIGN PATENT DOCUMENTS

| | | |
|---|---|---|
| CN | 105027184 A | 11/2015 |
| CN | 105182676 A | 12/2015 |

(Continued)

OTHER PUBLICATIONS

China National Intellectual Property Administration, First office action of Chinese application No. 202010642530.1 dated May 31, 2022, which is foreign counterpart application of this US application.

*Primary Examiner* — Darlene M Ritchie
(74) *Attorney, Agent, or Firm* — Lippes Mathias LLP

(57) ABSTRACT

Provided is a projection screen. The projection screen includes a first transparent cover plate, a transparent touch panel, and a first nanoparticle layer, wherein the first nanoparticle layer and the first transparent cover plate are sequentially laminated on one side of the transparent touch panel, and the first nanoparticle layer comprises a plurality of dispersed nanoparticles of different particle sizes. A
(Continued)

method for manufacturing a projection screen, a projection display system, and a projection display method are also provided.

19 Claims, 9 Drawing Sheets

(51) Int. Cl.

| | | |
|---|---|---|
| *B05B 1/20* | (2006.01) | |
| *B05B 13/04* | (2006.01) | |
| *B32B 7/12* | (2006.01) | |
| *B32B 17/06* | (2006.01) | |
| *B32B 27/06* | (2006.01) | |
| *G06F 3/041* | (2006.01) | |
| *G06F 3/044* | (2006.01) | |
| *H04N 9/31* | (2006.01) | |

(52) U.S. Cl.
CPC .............. *B32B 17/06* (2013.01); *B32B 27/06* (2013.01); *G06F 3/0416* (2013.01); *G06F 3/0446* (2019.05); *B05B 13/04* (2013.01); *B32B 2307/412* (2013.01); *B32B 2307/538* (2013.01); *B32B 2307/732* (2013.01); *B32B 2457/208* (2013.01); *G06F 2203/04103* (2013.01); *H04N 9/3179* (2013.01)

(58) Field of Classification Search
CPC ......... B32B 27/06; B32B 27/08; B32B 27/36; B32B 2307/412; B32B 2307/538; B32B 2307/732; B32B 2457/208; B32B 2250/40; B32B 2250/24; B32B 2255/10; B32B 2255/20; G06F 3/0416; G06F 3/0446; G06F 3/0354; G06F 3/044; G06F 3/03547; G06F 2203/04103; H04N 9/3179; H04N 9/3185; H04N 9/3194

See application file for complete search history.

(56) References Cited

U.S. PATENT DOCUMENTS

| | | | |
|---|---|---|---|
| 2012/0228110 A1* | 9/2012 | Takahashi | G06F 3/0445 174/250 |
| 2014/0185282 A1 | 7/2014 | Hsu et al. | |
| 2014/0285737 A1* | 9/2014 | Takahashi | H03K 17/962 174/253 |
| 2017/0168337 A1* | 6/2017 | Tanaka | G02F 1/136286 |
| 2017/0269788 A1 | 9/2017 | Zhan et al. | |
| 2019/0243227 A1* | 8/2019 | Den Boer | G06F 3/044 |
| 2021/0291489 A1* | 9/2021 | Yu | C04B 35/14 |
| 2021/0342026 A1* | 11/2021 | Routh | G06F 3/0412 |

FOREIGN PATENT DOCUMENTS

| | | | |
|---|---|---|---|
| CN | 106406450 A | | 2/2017 |
| CN | 108334223 A | * | 7/2018 |
| CN | 109062431 A | | 12/2018 |
| CN | 109188848 A | | 1/2019 |
| CN | 109545440 A | * | 3/2019 |
| CN | 210895411 U | | 6/2020 |
| CN | 114167675 A | * | 3/2022 |
| JP | 2001265249 A | | 9/2001 |
| JP | 2003005617 A | | 1/2003 |
| JP | 2010157044 A | | 7/2010 |
| JP | 2013020347 A | | 1/2013 |
| JP | 2017076216 A | | 4/2017 |
| JP | 2017161986 A | | 9/2017 |
| JP | 2017215383 A | | 12/2017 |
| KR | 100935451 B1 | | 1/2010 |

* cited by examiner

PROJECTION SCREEN, MANUFACTURING METHOD, AND DISPLAY SYSTEM HAVING NANOPARTICLE LAYERS

CROSS-REFERENCE TO RELATED APPLICATION

This application is a 371 of PCT application No. PCT/CN2021/099174, filed on Jun. 9, 2021, which claims priority to Chinese Patent Application No. 202010642530.1, filed on Jul. 6, 2020 and entitled "PROJECTION SCREEN, MANUFACTURING METHOD THEREFOR, PROJECTION DISPLAY SYSTEM, AND PROJECTION DISPLAY METHOD", the disclosures of which are herein incorporated by reference in their entireties.

TECHNICAL FIELD

The present disclosure relates to the field of display devices, and in particular, to a projection screen, a manufacturing method thereof, a projection display system, and a projection display method.

BACKGROUND

A projection display system is a system capable of projecting images or videos onto a projection screen. With the rapid development of display technology, a touch projection display system has become a research hotspot that gains much attention.

SUMMARY

Embodiments of the present disclosure provide a projection screen, a manufacturing method thereof, a projection display system, and a projection display method.

According to a first aspect, embodiments of the present disclosure provide a projection screen, wherein the projection screen includes a first transparent cover plate, a transparent touch panel, and a first nanoparticle layer, wherein the first nanoparticle layer and the first transparent cover plate are sequentially laminated on one side of the transparent touch panel, and the first nanoparticle layer comprises a plurality of dispersed nanoparticles of different particle sizes.

Optionally, the projection screen further includes a second transparent cover plate and a second nanoparticle layer, wherein the second nanoparticle layer and the second transparent cover plate are sequentially laminated on the other side of the transparent touch panel, and the second nanoparticle layer includes a plurality of dispersed nanoparticles of different particle sizes.

Optionally, distributions of nanoparticles of same particle sizes in the first nanoparticle layer and the second nanoparticle layer are same.

Optionally, a total particle concentration of nanoparticles in the first nanoparticle layer progressively increases from the center to an edge of the projection screen.

Optionally, the total particle concentration of the nanoparticles in the first nanoparticle layer ranges from $5*10^8/cm^2$ to $5*10^9/cm^2$.

Optionally, the nanoparticle comprises an inner core and an outer shell covering the inner core, wherein the inner core and the outer shell are made of different materials.

Optionally, the inner core is made of Si, the outer shell is made of Ag, and the nanoparticles of different particle sizes are different in terms of at least one of a thickness of the outer shell and a diameter of the inner core.

Optionally, the nanoparticles are ZnO, $Al_2O_3$, or $TiO_2$ nanoparticles.

Optionally, the particle sizes of the nanoparticles are not greater than 100 nm.

Optionally, the first nanoparticle layer further comprises a first transparent substrate, wherein the nanoparticles on the one side of the transparent touch panel are disposed on a surface of the first transparent substrate; and the second nanoparticle layer further comprises a second transparent substrate, wherein the nanoparticles on the other side of the transparent touch panel are disposed on a surface of the second transparent substrate.

Optionally, the first transparent cover plate, the first nanoparticle layer, the transparent touch panel, the second nanoparticle layer, and the second transparent cover plate are bonded by a transparent adhesive.

Optionally, a thickness of the first transparent cover plate ranges from 1 mm to 1.5 mm, and a thickness of the second transparent cover plate ranges from 1 mm to 1.5 mm.

Optionally, a thickness of the projection screen is not greater than 5 mm.

Optionally, the transparent touch panel includes a transparent substrate and a touch electrode pattern disposed on the transparent substrate; and the touch electrode pattern includes a plurality of touch driving electrodes, a plurality of touch sensing electrodes, and a touch signal line, wherein the touch driving electrodes and the touch sensing electrodes are intersected with each other, intersections of the touch driving electrodes and the touch sensing electrodes are spaced apart by a touch insulating layer, each of the touch driving electrodes is connected to one touch signal line, and each of the touch sensing electrodes is connected to one touch signal line; or the touch electrode pattern includes the touch signal line and a plurality of touch detection electrodes arranged in an array, wherein each of the touch detection electrodes is connected to one touch signal line.

Optionally, the touch electrode pattern is disposed on a side, proximal to the first transparent cover plate, of the transparent substrate, and a thickness of the second transparent cover plate is less than a thickness of the first transparent cover plate.

Optionally, the thickness of the first transparent cover plate is equal to a sum of the thickness of the second transparent cover plate and a thickness of the transparent substrate.

Optionally, the thickness of the first transparent cover plate ranges from 1 mm to 1.5 mm, and the thickness of the second transparent cover plate ranges from 1 mm to 1.5 mm.

Optionally, a thickness of the projection screen is not greater than 5 mm.

According to a second aspect, embodiments of the present disclosure further provide a projection display system, including a projector, a controller, and the projection screen as defined in the first aspect, wherein the controller is connected to a transparent touch panel of the projection screen and is connected to the projector, and the controller is configured to control the projector based on a touch signal outputted by the transparent touch panel to perform projection display.

According to a third aspect, embodiments of the present disclosure further provide a method for manufacturing a projection screen, including:

forming a first nanoparticle layer, wherein the first nanoparticle layer comprises a plurality of dispersed nanoparticles of different particle sizes; and forming the projection screen by sequentially laminating the first nanoparticle layer and a first transparent cover plate on one side of a transparent touch panel.

Optionally, forming the first nanoparticle layer includes:

forming a nanoparticle sol on a surface of the first transparent cover plate; or forming the first nanoparticle layer includes:

providing a transparent substrate thin film;

forming the nanoparticle sol on a surface of the transparent substrate thin film; and arranging the transparent substrate thin film on a side of the first transparent cover plate.

Optionally, forming the nanoparticle sol on the surface of the first transparent cover plate includes:

orientating a spray head toward the first transparent cover plate, wherein the spray head is provided with a plurality of spray openings, wherein a distribution density of the plurality of spray openings progressively increases from a middle position to positions of two ends along an arrangement direction of the plurality of spray openings or sizes of the plurality of spray openings progressively increase from the middle position to the positions of the two ends along the arrangement direction of the plurality of spray openings, and making the arrangement direction of the plurality of spray openings parallel to a first lateral side of the first transparent cover plate; and relatively moving the spray head along a second lateral side of the first transparent cover plate, wherein during movement, the spray head sprays the nanoparticle sol to the first transparent cover plate with a moving speed being first increased and then decreased.

Optionally, forming the nanoparticle sol on the surface of the transparent substrate thin film includes:

orientating a spray head toward the transparent substrate thin film, wherein the spray head is provided with a plurality of spray openings, wherein a distribution density of the plurality of spray openings progressively increases from a middle position to positions of two ends along an arrangement direction of the plurality of spray openings or sizes of the plurality of spray openings progressively increase from the middle position to positions of two ends along the arrangement direction of the plurality of spray openings, and making the arrangement direction of the plurality of spray openings parallel to a first lateral side of the transparent substrate thin film; and moving the spray head along a second lateral side of the transparent substrate thin film, wherein during movement of the spray head, the spray head sprays the nanoparticle sol to the transparent substrate thin film with a moving speed being first increased and then decreased.

According to a fourth aspect, embodiments of the present disclosure further provide a projection display method, wherein the projection display method is applicable to the projection display system as defined in the second aspect, and the method includes:

acquiring mapping indication information, wherein the mapping indication information is configured to indicate a mapping relationship between a touch coordinate system and an image coordinate system; and determining coordinates of a touch position in the image coordinate system based on the mapping indication information and the touch position.

Optionally, prior to acquiring the mapping indication information, the method further includes:

projecting a default image onto a projection screen;

acquiring position indication information, wherein the position indication information is configured to indicate a relative position relationship between an observer, a projector, and the projection screen; and adjusting a projection image based on the position indication information.

The technical solutions provided in the embodiments of the present disclosure at least achieve the following beneficial effects.

In the case that the projection screen receives light emitted by a projector, the nanoparticles of nanoscale sizes can scatter the light, and the wavelengths of the light scattered by the nanoparticles of different particle sizes are also different, such that light of different colors projected onto the projection screen by the projector can be scattered, and then the scattered light can enter the eyes of an observer. Therefore, the observer can perceive an image projected by the projector by receiving the light of various colors scattered by the nanoparticles.

BRIEF DESCRIPTION OF THE DRAWINGS

For clearer descriptions of the technical solutions of the embodiments of the present disclosure, the following briefly describes the accompanying drawings required for describing the embodiments. Apparently, the accompanying drawings in the following description show merely some embodiments of the present disclosure, and a person of ordinary skill in the art may still derive other drawings from these accompanying drawings without creative efforts.

DETAILED DESCRIPTION

To make the objectives, technical solutions, and advantages of the present disclosure clearer, the implementations of the present disclosure are further described in detail hereinafter with reference to the accompanying drawings.

Figure 1:
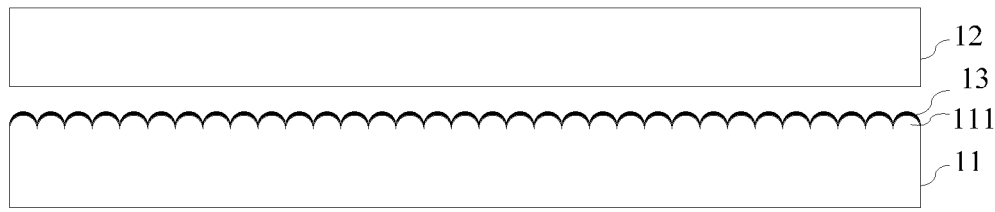
FIG. 1 is a schematic structural diagram of a projection screen in the related art.

FIG. 1 is a schematic structural diagram of a projection screen in the related art. As shown in FIG. 1, the projection screen includes a first transparent substrate 11 and a second transparent substrate 12. The first transparent substrate 11 and the second transparent substrate 12 are oppositely arranged. A surface, proximal to the second transparent substrate 12, of the first transparent substrate 11 is etched with an acid to form a scattering surface III. A conductive coating 13 is formed on the scattering surface 111. The conductive coating 13 is patterned to be a touch electrode. That is, in the projection screen, a surface of the first transparent substrate 11 is etched to form the scattering surface 111 with a rough surface, such that the light emitted by a projector can be scattered, and then the scattered light emitted by the projector can enter the eyes of an observer. However, it is difficult to control the speed of acid etching. As a result, different regions on the scattering surface may have different etching degrees and may scatter light rays to different degrees, thereby leading to poor picture quality of imaging and highly varied brightness and contrast in the different regions.

Figure 2:
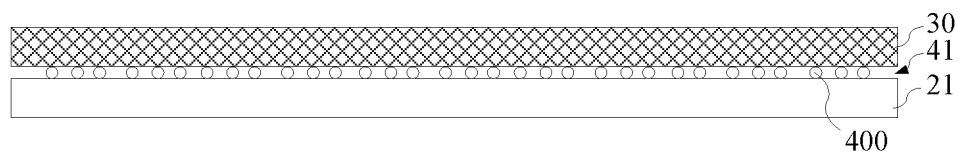
FIG. 2 is a schematic structural diagram of a projection screen according to an embodiment of the present disclosure.

FIG. 2 is a schematic structural diagram of a projection screen according to an embodiment of the present disclosure. As shown in FIG. 2, the projection screen includes a first transparent cover plate 21, a transparent touch panel 30, and a first nanoparticle layer 41. The first nanoparticle layer 41 and the first transparent cover plate 21 are sequentially laminated on one side of the transparent touch panel 30. The first nanoparticle layer 41 includes a plurality of nanoparticles 400 of different particle sizes dispersed between the first transparent cover plate 21 and the transparent touch panel 30.

In the embodiments of the present disclosure, the nanoparticles 400 of a same particle size are regarded as a same type of nanoparticles, and the nanoparticles 400 of different particle sizes are regarded as different types of nanoparticles. The dispersion means being arranged in a fashion of being spaced apart.

The projection screen may include a plurality of imaging regions arranged in an array, wherein each region is dispersed with a plurality of nanoparticles 400.

In the case that the projection screen receives light emitted by a projector, the nanoparticles of nanoscale sizes can scatter the light, and the wavelengths of the light scattered by the nanoparticles of different particle sizes are also different, such that light of different colors projected onto the projection screen by the projector can be scattered, and then the scattered light can enter the eyes of an observer. Therefore, the observer can perceive an image projected by the projector by receiving the light of various colors scattered by the nanoparticles.

The wavelengths of light that the nanoparticles 400 can scatter are related to the sizes of the nanoparticles 400. The nanoparticles 400 of different particle sizes can scatter light of different wavelengths. Light of various colors can be scattered by disposing the plurality of nanoparticles 400 of different particle sizes, such that a picture can be presented. Compared with the way of acid etching to form the scattering surface, using the nanoparticles 400 for scattering avoids problems of poor picture quality of imaging and great differences in brightness and contrast in different regions caused by acid etching.

Figure 3:
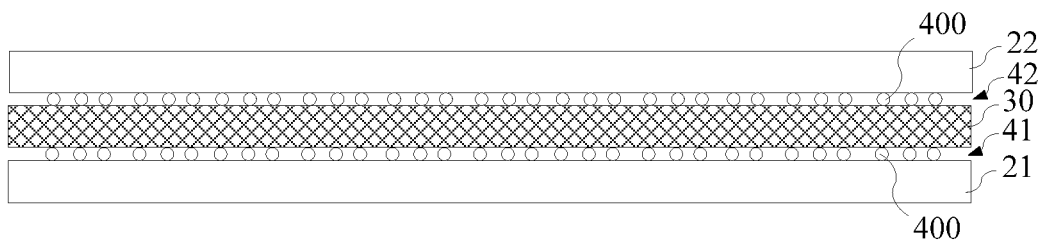
FIG. 3 is a schematic structural diagram of a projection screen according to an embodiment of the present disclosure.

FIG. 3 is a schematic structural diagram of a projection screen according to an embodiment of the present disclosure. Compared with the projection screen shown in FIG. 2, the projection screen shown in FIG. 3 may further include a second transparent cover plate 22 and a second nanoparticle layer 42. The second nanoparticle layer 42 and the second transparent cover plate 22 are sequentially laminated on the other side of the transparent touch panel 30. The second nanoparticle layer 42 includes a plurality of nanoparticles 400 of different particle sizes dispersed between the second transparent cover plate 22 and the transparent touch panel 30. The second transparent cover plate 22 and the second nanoparticle layer 42 are arranged, such that picture effects observed by an observer on two sides of the projection screen are more similar.

Figure 4:
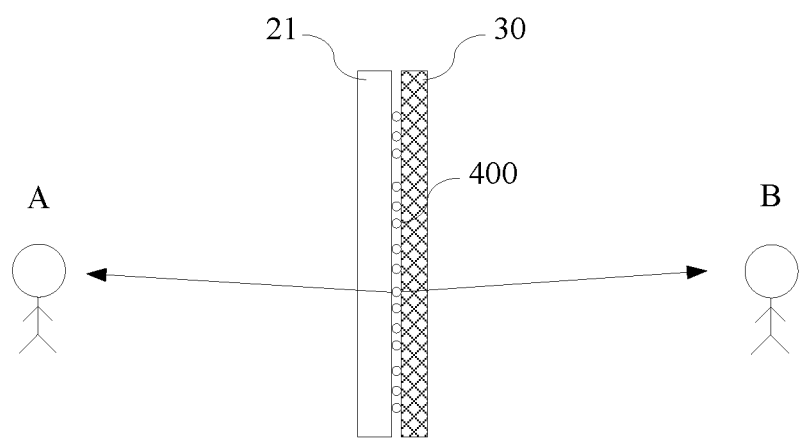
FIG. 4 is a schematic diagram of a projection screen in use according to an embodiment of the present disclosure.

FIG. 4 is a schematic diagram of a projection screen in use according to an embodiment of the present disclosure. As shown in FIG. 4, among light rays scattered by the nanoparticles 400, a light ray propagated to an observer A needs to pass through the first transparent cover plate 21, and a light ray propagated to an observer B needs to pass through the transparent touch panel 30. Because the first transparent cover plate 21 and the transparent touch panel 30 definitely differ in some terms of optical properties, pictures observed by observer A and observer B may have some differences, such as differences in terms of brightness, contrast, and the like.

Figure 5:
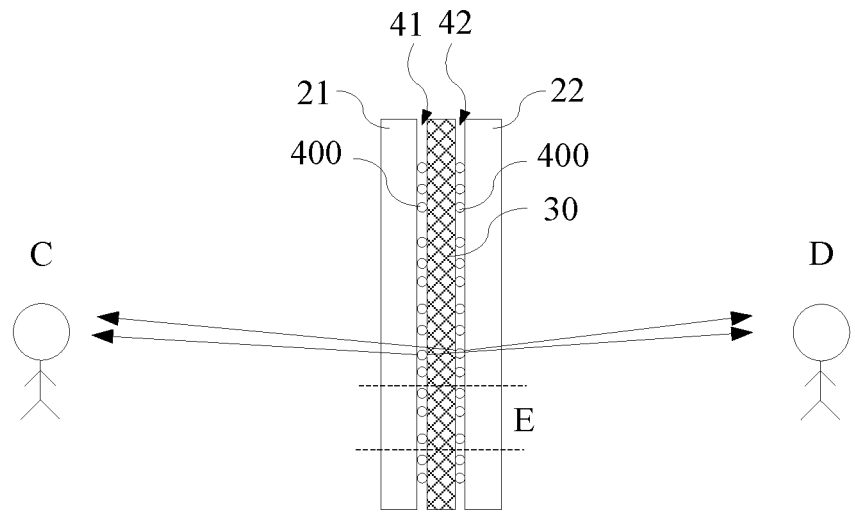
FIG. 5 is a schematic diagram of a projection screen in use according to an embodiment of the present disclosure.

FIG. 5 is a schematic diagram of a projection screen in use according to an embodiment of the present disclosure. As shown in FIG. 5, both the nanoparticle 400 in the first nanoparticle layer 41 and the nanoparticle 400 in the second nanoparticle layer 42 scatter light rays. Light rays propagated to an observer C include two parts. One part of the light rays is scattered by the nanoparticles 400 in the first nanoparticle layer 41, which passes through the first transparent cover plate 21 and then is received by the observer C. The other part of light rays is scattered by the nanoparticles 400 in the second nanoparticle layer 42, which passes through the transparent touch panel 30 and the first transparent cover plate 21 and then is received by the observer C. Light rays propagated to an observer D also include two parts. One part of light rays is scattered by the nanoparticles 400 in the second nanoparticle layer 42, which passes through the second transparent cover plate 22 and then is received by the observer D, The other part of light rays is scattered by the nanoparticles 400 in the first nanoparticle layer 41, which passes through the transparent touch panel 30 and the second transparent cover plate 22 and then is received by the observer D. It can be seen that both the light received by the observer C and the light received by the observer D include light that only passes through a transparent cover plate and light that passes through a transparent cover plate and the transparent touch panel. In this way, compared with the differences between pictures respectively observed by observer A and observer B, pictures observed by observer C and observer D have fewer differences, for example, fewer differences in the terms of brightness and contrast.

Optionally, distributions of nanoparticles 400 of a same particle size in the first nanoparticle layer 41 and the second nanoparticle layer are same. The same distributions herein mean that particle concentrations are the same in a same region of the projection screen. The particle concentration means a number of nanoparticles 400 distributed in a unit area. This facilitates reducing differences between the pictures observed by observer C and observer D.

As shown in FIG. 5, an arbitrary region E on the projection screen is chosen as an example. Light rays projected by a projector onto the region E are scattered by the nanoparticles 400 in the first nanoparticle layer 41 and the nanoparticles 400 in the second nanoparticle layer 42. Because the distributions of nanoparticles 400 of the same particle size in the two nanoparticle layers are the same, in the region E, the colors of the light rays scattered by the nanoparticles 400 in the first nanoparticle layer 41 and the colors of the light rays scattered by the nanoparticles 400 in the second nanoparticle layer 42 are the same. Therefore, the differences between the pictures observed by observer C and observer D can be further reduced.

Optionally, a total particle concentration of the nanoparticles 400 in the first nanoparticle layer 41 progressively increases from a center to an edge of the projection screen. That is, in a region of the first nanoparticle layer 41 farther away from a geometric center of the projection screen, the particle concentration is higher. The progressive increase may be a continuous increase or a stepped increase with the increase of a distance from the geometric center of the projection screen. During the projecting process of an image by the projector, light rays close to the center of a picture are usually stronger, and light rays closer to an edge are usually weaker. As a result, the brightness at the center of the picture is much higher than the brightness at an edge of the picture. The total particle concentration is progressively increased from the center to the edge of the projection screen, such that the scattering effect of the edge of the projection screen for the light rays is enhanced, thereby making the brightness of the picture more uniform.

The distributions of the nanoparticles 400 of the same particle size in the first nanoparticle layer 41 and the second nanoparticle layer are the same. Therefore, the total particle concentration of the nanoparticles 400 in the second nanoparticle layer 42 also progressively increases from the center to the edge of the projection screen.

Optionally, the total particle concentration of the nanoparticles 400 in the first nanoparticle layer 41 ranges from $5*10^8/cm^2$ to $5*10^9/cm^2$. For example, the particle concentration, in a region close to an edge of the projection screen, of the first nanoparticle layer 41 is $5*10^9/cm^2$, That is, a total number of nanoparticles 400 of various particle sizes dispersed in every square centimeter is $5*10^9$. Within this range, a haze of the projection screen is not greater than 10%, a reflectivity of the projection screen ranges from 4% to 10%, and an imaged picture is clear and visible in an indoor illumination environment.

A particle concentration, at an edge of the projection screen, of the first nanoparticle layer 41 may be greater than a particle concentration, at the center of the projection screen, of the first nanoparticle layer 41 by 8% to 12%. For example, in this embodiment of the present disclosure, the particle concentration, at an edge of the projection screen, of the first nanoparticle layer 41 is greater than the particle concentration, at the center of the projection screen, of the first nanoparticle layer 41 by 10%.

In the case that the concentration of the nanoparticles 400 is excessively low, a relatively small number of light rays can be scattered into the eyes of the observer, which may cause an image formed on the projection screen to have relatively low brightness. Gaps between the nanoparticles 400 allow light rays to transmit through the projection screen, which can make the projection screen transparent. An excessively high concentration may increase the haze of the projection screen and reduce the transparency of the projection screen. By keeping the concentration of the nanoparticles 400 within the range, a picture imaged on the projection screen has relatively high brightness, the transparency of the projection screen is also relatively high, and the picture on the projection screen can be clearly observed on both sides of the projection screen.

Optionally, the particle sizes of the nanoparticles 400 are not greater than 100 nm. That is, the diameter of a nanoparticle 400 with a largest particle size is not greater than 100 nm. The nanoparticles 400 of different particle sizes scatter light of different wavelengths. The nanoparticles 400 with particle sizes ranging from 0 nm to 100 nm can scatter all light rays within a visible light band.

Figure 6:
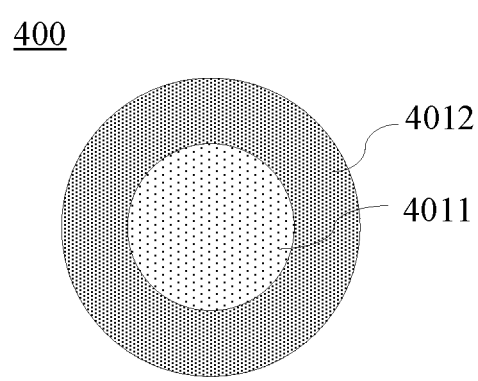
FIG. 6 is a schematic structural diagram of a nanoparticle according to an embodiment of the present disclosure.

FIG. 6 is a schematic structural diagram of a nanoparticle according to an embodiment of the present disclosure. As shown in FIG. 6, a nanoparticle 400 includes an inner core 4011 and an outer shell 4012 covering the inner core 4011. The inner core 4011 and the outer shell 4012 are made of different materials. The light that the nanoparticles 400 can scatter is not only related to the particle sizes of the nanoparticles 400 but also related to the structure and material of the nanoparticle 400.

For example, the inner core 4011 is made of Si, the outer shell 4012 is made of Ag, and the nanoparticles 400 of different particle sizes are different in terms of at least one of a thickness of the outer shell 4012 and a diameter of the inner core 4011. The materials, the diameter of the inner core 4011, and the thickness of outer shell 4012 can be adjusted to make the nanoparticle 400 scatter light of a specific wavelength.

A nanoparticle 400 that includes the inner core 4011 made of Si and the outer shell 4012 made of Ag is taken as an example. A nanoparticle 400 that includes the inner core 4011 with a diameter of 1.3 nm and the outer shell 4012 with a thickness of 30.8 nm strongly scatters blue light, and the scattered light rays are centered at a wavelength of 458 nm. A nanoparticle 400 that includes the inner core 4011 with a diameter of 22.2 nm and the outer shell 4012 with a thickness of 15.8 nm strongly scatters green light, and the scattered light rays are centered at a wavelength of 532 nm. A nanoparticle 400 that includes the inner core 4011 with a diameter of 34.3 nm and the outer shell 4012 with a thickness of 11.0 nm strongly scatters red light, and the scattered light rays are centered at a wavelength of 640 nm.

In other possible implementations, the nanoparticles 400 may be made of metal oxide. For example, the nanoparticles 400 are zinc oxide ZnO, aluminum oxide $Al_2O_3$, or titanium oxide $TiO_2$ nanoparticles.

Figure 7:
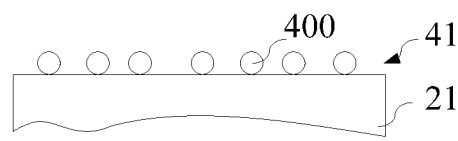
FIG. 7 is a partially enlarged schematic diagram of a projection screen according to an embodiment of the present disclosure.

FIG. 7 is a partially enlarged schematic diagram of a projection screen according to an embodiment of the present disclosure. As shown in FIG. 7, the first nanoparticle layer 41 includes nanoparticles 400 dispersed on a surface of the first transparent cover plate 21. The first nanoparticle layer 41 is directly formed on the first transparent cover plate 21 by taking the first transparent cover plate 21 as a carrier, which facilitates reducing a total thickness of the projection screen.

Figure 8:
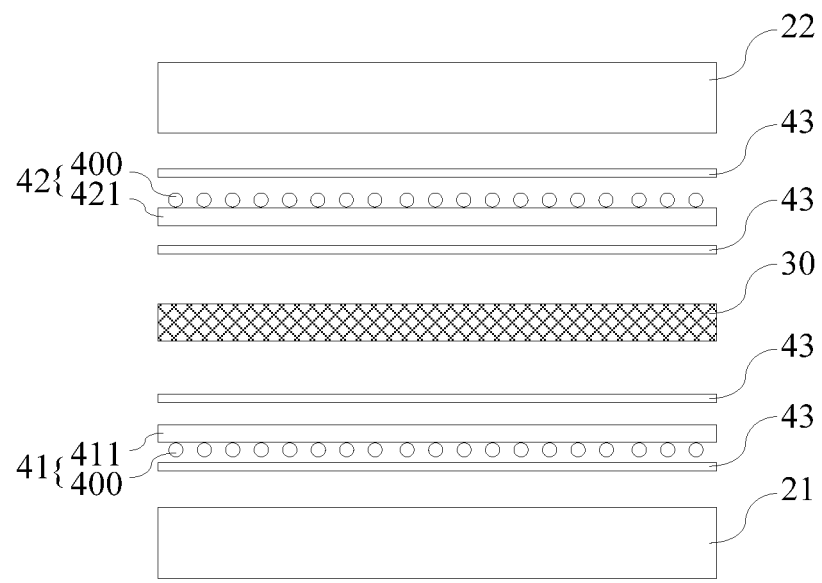
FIG. 8 is a partially enlarged schematic diagram of a projection screen according to an embodiment of the present disclosure.

FIG. 8 is a schematic structural diagram of a projection screen according to an embodiment of the present disclosure. Compared with the projection screen shown in FIG. 7, in the projection screen shown in FIG. 8, the first nanoparticle layer 41 further includes a first transparent substrate 411, and the second nanoparticle layer 42 further includes a second transparent substrate 421, wherein the nanoparticles 400 on the one side of the transparent touch panel 30 are disposed on a surface of the first transparent substrate 411, and the nanoparticles 400 on the other side of the transparent touch panel 30 are disposed on a surface of the second transparent substrate 421.

As shown in FIG. 8, the first nanoparticle layer 41 includes the first transparent substrate 411 and the nanoparticles 400. The nanoparticles 400 are disposed on the surface of the first transparent substrate 411, and the first transparent substrate 411 is disposed between the first transparent cover plate 21 and the transparent touch panel 30. The first transparent substrate 411 is used as a carrier for the nanoparticles 400. During the manufacturing of the projection screen, the first transparent substrate 411 carrying the nanoparticles 400 may be directly disposed between the first transparent cover plate 21 and the transparent touch panel 30, making the manufacturing more convenient.

The first transparent substrate 411 may be a transparent thin film, for example, a polyethylene terephthalate (PET) film.

Illustratively, the first transparent substrate 411 may be bonded on a surface of the first transparent cover plate 21 by a transparent adhesive 43, for example, bonded by an optically clear adhesive (OCA) or an optically clear resin (OCR).

The nanoparticles 400 may be disposed on a side, proximal to the first transparent cover plate 21, of the first transparent substrate 411, or may be disposed on a side, proximal to the transparent touch panel 30, of the first transparent substrate 411.

The structure of the second nanoparticle layer 42 may be the same as the structure of the first nanoparticle layer 41. That is, the second nanoparticle layer 42 may include nanoparticles 400 dispersed on a surface of the second transparent cover plate 22. Alternatively, as shown in FIG. 8, the second nanoparticle layer 42 includes the second transparent substrate 421 and the nanoparticles 400. The first transparent substrate 421 may be bonded on the surface of the second transparent cover plate 22.

Optionally, the first transparent cover plate 21, the first nanoparticle layer 41, the transparent touch panel 30, the second nanoparticle layer 42, and the second transparent cover plate 22 may all be bonded by the transparent adhesive 43. The transparent adhesive 43 may be an OCA or an OCR. Both the OCA and the OCR have good transparency, high light transmittance, and less light absorption.

A refractive index of the transparent adhesive 43 ranges from 1.45 to 1.6. The refractive index of the transparent adhesive 43 should be as close as possible to a refractive index of a transparent structure with which the transparent adhesive 43 is in contact. For example, the refractive index of the transparent adhesive 43 bonding the first transparent cover plate 21 and the first nanoparticle layer 41 should be as close as possible to a refractive index of the first transparent cover plate 21 or the first nanoparticle layer 41.

The thickness of the transparent adhesive 43 ranges from 0.1 mm to 0.25 mm. The thickness of the transparent adhesive 43 affects a firmness of the bonding and light transmittance. Reducing the thickness can increase the light transmittance but reduce the firmness of the bonding. In contrast, increasing the thickness can increase the firmness of the bonding but reduce the light transmittance. In the case that sufficient firmness is ensured, the thickness of the transparent adhesive 43 can be minimized as much as possible.

The peel force of the transparent adhesive 43 is not smaller than 0.1 N/mm, such that the projection screen can have sufficient strength. In the case that the thickness of the transparent adhesive 43 is set to range from 0.1 mm and 0.25 mm, both the value of the peel force and the light transmittance are acceptable.

Optionally, both the first transparent cover plate 21 and the second transparent cover plate 22 may be glass cover plates or plastic cover plates. The first transparent cover plate 21 and the second transparent cover plate 22 can provide protection, to prevent the first nanoparticle layer 41, the transparent touch panel 30, and the second nanoparticle layer 42 from external damage such as scratching.

The first transparent cover plate 21 and the second transparent cover plate 22 are same transparent cover plates. Taking the first transparent cover plate 21 as an example, the roughness of a surface, distal from the transparent touch panel 30, of the first transparent cover plate 21 may range from 0.15 µm and 0.25 µm, and the first transparent cover plate 21 is sufficiently resistant to rubbing. For example, there should be no scratch left on the first transparent cover plate 21 to meet a touch requirement upon the first transparent cover plate 21 being rubbed with steel wool of 2 cm*2 cm 2000 times with the load of 500 grams.

The sizes of the first transparent cover plate 21 and the second transparent cover plate 22 may be set depending on the area of a projection screen that needs to be manufactured. For a rectangular projection screen, both the first transparent cover plate 21 and the second transparent cover plate 22 are rectangular. The size herein usually refers to the length of a diagonal. For example, both the sizes of the first transparent cover plate 21 and the second transparent cover plate 22 may be 110 inches. That is, the length of the diagonal of the first transparent cover plate 21 and the length of the diagonal of the second transparent cover plate 22 are both 110 inches. For projection screens of other possible shapes, for example, a circular projection screen, both the first transparent cover plate 21 and the second transparent cover plate 22 are circular, and in this case, the sizes refer to the diameters of the first transparent cover plate 21 and the second transparent cover plate 22.

Optionally, a thickness of the first transparent cover plate 21 ranges from 1 mm to 1.5 mm, and a thickness of the second transparent cover plate 22 ranges from 1 mm to 1.5 mm. The thicknesses of the first transparent cover plate 21 and the second transparent cover plate 22 may be set considering the strength thereof. The first transparent cover plate 21 and the second transparent cover plate 22 need to have sufficient strength to provide protection. Excessively small thicknesses may cause an excessively low structural strength for the projection screen. In the meantime, excessively great thicknesses may affect the light transmittance of the first transparent cover plate 21 and the second transparent cover plate 22. Moreover, excessively great thicknesses may lead to ghosting, thereby degrading an imaging effect. In the case that the strength is sufficient, the thicknesses of the first transparent cover plate 21 and the second transparent cover plate 22 can be minimized as much as possible. With a thickness ranging from 1 mm to 1.5 mm, a strength requirement usually can be satisfied and there is no obvious ghosting.

Both the first transparent cover plate 21 and the second transparent cover plate 22 have light transmittance not smaller than 85% and haze not greater than 3%, such that the projection screen can have sufficient transparency.

Figure 9:
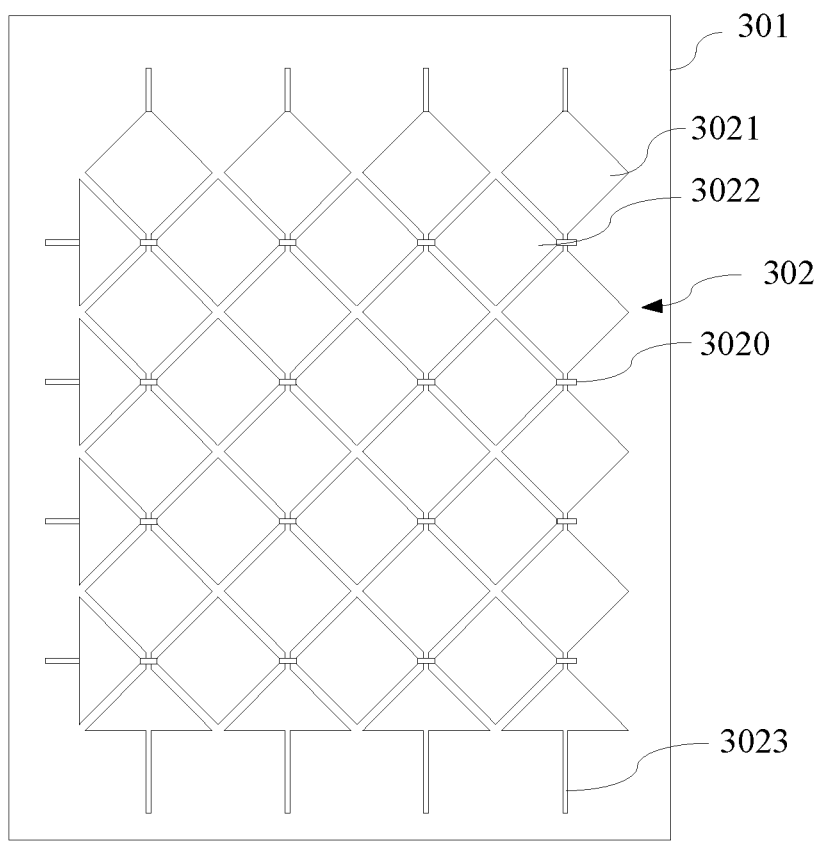
FIG. 9 is a partial schematic structural diagram of a transparent touch panel according to an embodiment of the present disclosure.

The transparent touch panel 30 is a capacitive touch panel. FIG. 9 is a partial schematic structural diagram of a transparent touch panel according to an embodiment of the present disclosure. As shown in FIG. 9, the transparent touch panel 30 includes a transparent substrate 301 and a touch electrode pattern 302 disposed on the transparent substrate 301.

Optionally, the touch electrode pattern 302 is disposed on a side, proximal to the first transparent cover plate 21, of the transparent substrate 301, and the thickness of the second transparent cover plate 22 is smaller than the thickness of the first transparent cover plate 21. The touch electrode pattern 302 is disposed on a side, proximal to the first transparent cover plate 21, of the transparent substrate 301. Therefore, in the case that a touch operation is performed from a side of the first transparent cover plate 21, a spacing between an operator's finger and the touch electrode pattern 302 is only affected by the thickness of the first transparent cover plate 21. In the case that the touch operation is performed from a side of the second transparent cover plate 22, the spacing between the operator's finger and the touch electrode pattern 302 is affected by the thickness of the second transparent cover plate 22 and the thickness of the transparent substrate 301. The spacing between the finger and the touch electrode pattern 302 affects touch sensitivity. The thickness of the second transparent cover plate 22 is set to be smaller than the thickness of the first transparent cover plate 21, which facilitates making the touch sensitivity on two sides equal.

Optionally, the thickness of the first transparent cover plate 21 is equal to a sum of the thickness of the second transparent cover plate 22 and the thickness of the transparent substrate 301. In this way, the touch sensitivity of a touch operation performed from the side of the first transparent cover plate 21 is the same as the touch sensitivity of a touch operation performed from the side of the second transparent cover plate 22. For example, the thickness of the first transparent cover plate 21 is 1.5 mm, the thickness of the second transparent cover plate 22 is 1 mm, and the thickness of the transparent substrate is 0.5 mm.

The thickness of the transparent substrate 301 may range from 0.5 mm to 1.0 mm. In the case that the transparent substrate 301 is excessively thin, the transparent touch panel 30 may have excessively low structural strength. In the case that the transparent substrate 301 is excessively thick, a distance between the first nanoparticle layer 41 and the second nanoparticle layer 42 is large, and a coincidence degree between the picture imaged by the first nanoparticle layer 41 and the picture imaged by the second nanoparticle layer 42 is reduced, which may cause the ghosting and degrade an imaging effect. In the case that the strength is sufficient, the thicknesses of the transparent substrate 301 can be minimized as much as possible. With a thickness ranging from 0.5 mm to 1.0 mm, a strength requirement usually can be satisfied and no obvious ghosting is formed.

As shown in FIG. 9, the touch electrode pattern 302 of the transparent touch panel 30 includes a plurality of touch driving electrodes 3021, a plurality of touch sensing electrodes 3022, and a touch signal line 3023. The touch driving electrodes 3021 and the touch sensing electrodes 3022 are intersected with each other. Intersections of the touch driving electrodes 3021 and the touch sensing electrodes 3022 are spaced apart by a touch insulating layer. Each of the touch driving electrodes 3021 is connected to one touch signal line 3023 and each of the touch sensing electrodes 3022 is connected to one touch signal line 3023.

Each of the touch driving electrodes 3021 and each of the touch sensing electrodes 3022 include a plurality of electrode blocks, wherein the electrode blocks are all arranged in a same layer. As shown in FIG. 9, in the embodiment of the present disclosure, the electrode blocks are rhombic.

The electrode blocks in one of the touch driving electrode 3021 and the touch sensing electrode 3022 are electrically connected by connecting blocks in the same layer as the electrode blocks. The electrode blocks in the other of the touch driving electrode 3021 and the touch sensing electrode 3022 are connected by touch bridges 3020 in a different layer from the electrode blocks. The connecting blocks and the touch bridges 3020 are insulated and spaced apart by an insulating layer.

In an example, the electrode blocks of the touch driving electrode 3021 are electrically connected by connecting blocks, and the electrode blocks of the touch sensing electrode 3022 are connected by the touch bridges 3020.

Illustratively, the insulating layer may be a stack layer formed by one or more of a silicon oxide layer, a silicon nitride layer, or a silicon oxynitride layer.

The electrode block, the connecting block, and the touch bridge 3020 may all be made of metal or indium tin oxide (ITO). The materials of the electrode block, the connecting block, and the touch bridge 3020 may be the same or different.

Figure 10:
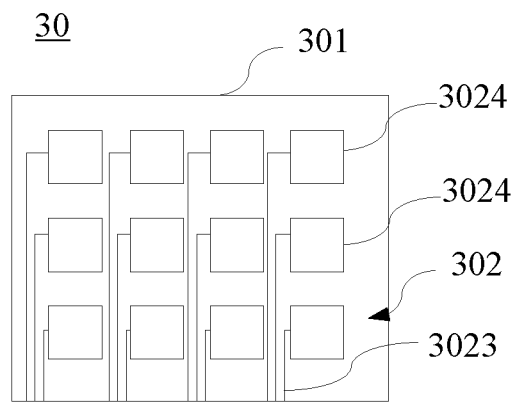
FIG. 10 is a partial schematic structural diagram of a transparent touch panel according to an embodiment of the present disclosure.

FIG. 10 is a partial schematic structural diagram of a transparent touch panel according to an embodiment of the present disclosure. As shown in FIG. 10, the touch electrode pattern 302 of the transparent touch panel 30 includes the touch signal line 3023 and a plurality of touch detection electrodes 3024 arranged in an array.

The structures of the transparent touch panels 30 shown in FIG. 9 and FIG. 10 are only examples of the embodiments of the present disclosure. Other structural forms in the related art may be used for the structure of the transparent touch panel 30.

Optionally, a total thickness of the projection screen is not great than 5 mm. The larger the overall thickness of the projection screen is, the more the obvious ghosting is likely to occur. A smaller thickness facilitates improving the picture effect.

Figure 11:
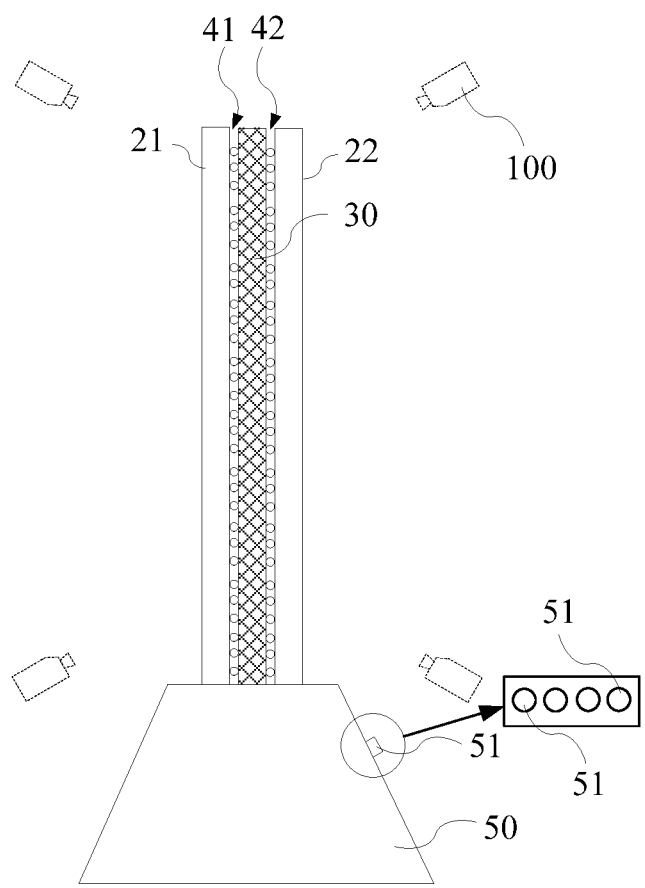
FIG. 11 is a partial schematic structural diagram of a projection screen according to an embodiment of the present disclosure.

FIG. 11 is a partial schematic structural diagram of a projection screen according to an embodiment of the present disclosure. As shown in FIG. 11, the projection screen may further include a base 50. The first transparent cover plate 21, the first nanoparticle layer 41, the transparent touch panel 30, the second nanoparticle layer 42, and the second transparent cover plate 22 are mounted on the base 50. The base 50 can provide support to facilitate the placement of the projection screen.

The base 50 may be provided with an operation button 51 to facilitate the user's operations. For example, the operations include at least a power-on operation. The operation buttons 51 may be disposed on only one side of the projection screen or may be disposed on two sides of the projection screen. The operation button 51 may be a physical button or may be a virtual button. In the case that the operation button 51 is a virtual button, the base 50 may include a touch screen to provide the virtual button.

The projection screen may further include a remote control. The remote control may achieve the same functions as the operation button 51 to facilitate the user's operations.

As shown in FIG. 11, in the case that the projection screen is used for projection display, a projector 100 usually has four placement positions. On a same side of the projection screen, the projector 100 may be placed at a higher position or a lower position. For the two positions, in addition to the difference in height, the projector 100 is rotated by 180° around an axis of a lens thereof. The projection screen may be further communicatively connected to the projector 100. Different projection modes may be chosen through the operation button 51, so as to make the projector 100 form an upright image on the projection screen.

Figure 12:
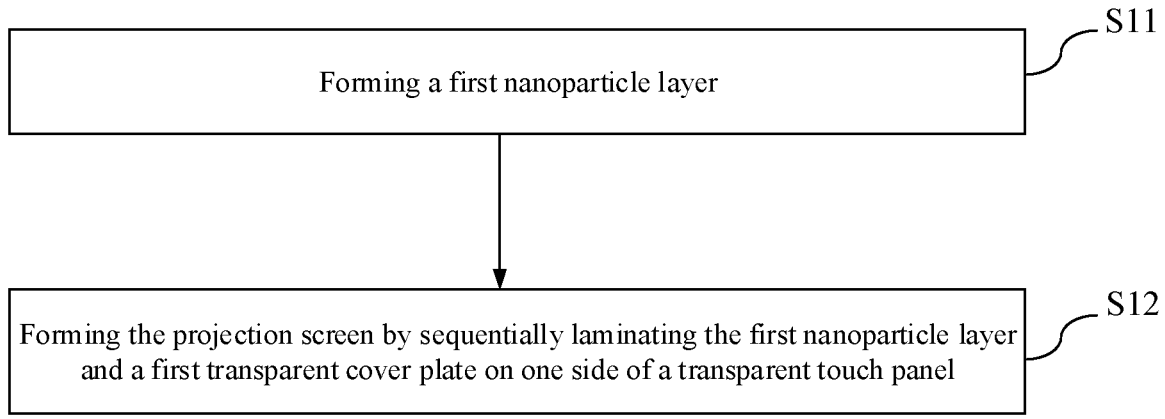
FIG. 12 is a flowchart of a method for manufacturing a projection screen according to an embodiment of the present disclosure.

FIG. 12 is a flowchart of a method for manufacturing a projection screen according to an embodiment of the present disclosure. The method is used to manufacture the projection screen shown in FIG. 2 to FIG. 11. As shown in FIG. 12, the manufacturing method includes the following processes.

In process S11, a first nanoparticle layer is formed.

The first nanoparticle layer includes a plurality of dispersed nanoparticles of different particle sizes.

In process S12, the projection screen is formed by sequentially laminating the first nanoparticle layer and a first transparent cover plate on one side of a transparent touch panel, During manufacturing of the projection screen shown in FIG. 7, the process S11 may include forming a nanoparticle sol on a surface of the first transparent cover plate.

In conjunction with FIG. 7, a nanoparticle sol is directly formed on the first transparent cover plate 21, and in the case that the nanoparticle sol is solidified, the first nanoparticle layer 41 may be directly formed on the first transparent cover plate 21. The first transparent cover plate 21 is directly used as a carrier, which facilitates reducing a total thickness of the projection screen.

Figure 13:
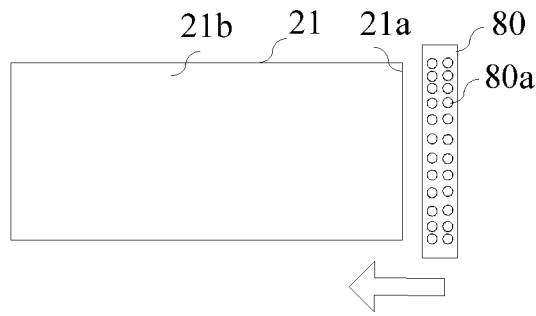
FIG. 13 is a schematic diagram of a process of forming a nanoparticle sol according to an embodiment of the present disclosure.

FIG. 13 is a schematic diagram of a process of forming a nanoparticle sol according to an embodiment of the present disclosure. As shown in FIG. 13, the nanoparticle sol may be sprayed by a spray head 80 onto the first transparent cover plate 21. The spray head 80 is provided with a plurality of spray openings 80a. The plurality of spray openings 80a may be linearly distributed, and the distribution density of the plurality of spray openings 80a progressively increases from a middle position to positions at two ends. The distribution density means a number of the spray openings 80a in a unit area. As shown in FIG. 13, in an arrangement direction of the spray openings 80a, a distribution density of spray openings 80a close to the middle position is relatively small, and distribution densities of spray openings 80a close to two ends are relatively large. Alternately, sizes of the plurality of spray openings 80a may progressively increase from the middle position to positions at the two ends. During the spraying process of the nanoparticle sol to the first transparent cover plate 21, the spray openings 80a should correspond to the middle of the first transparent cover plate 21.

As shown in FIG. 13, the spray head 80 is orientated toward the first transparent cover plate 21, and the arrangement direction of the plurality of spray openings 80a is made parallel to a first lateral side 21a of the first transparent cover plate 21. The spray head 80 is moved along a second lateral side 21b of the first transparent cover plate 21 (the movement is relative, and in practice, the first transparent cover plate 21 may be moved). A direction shown by an arrow in FIG. 13 is the movement direction of the spray head 80. During movement of the spray head 80, the spray head 80 sprays the nanoparticle sol to the first transparent cover plate 21 with a moving speed being first increased and then decreased.

The distribution density of the plurality of spray openings 80a progressively increases from the middle position to positions at two ends along an arrangement direction of the plurality of spray openings 80a. Therefore, in the case that the spray head 80 sprays the nanoparticle sol, along a direction of the first lateral side 21a. The concentration of nanoparticles sprayed to the middle position of the first transparent cover plate 21 is relatively low, and the concentration of nanoparticles sprayed to an edge is relatively high. During movement of the spray head 80, the speed of the movement is first increased and then decreased. That is, along a direction of the second lateral side 21b, the spray head 80 moves fast in the middle of the first transparent cover plate 21 and moves slowly at an edge. In this way, by comprehensively setting the distribution density of the spray openings 80a and the moving speed of the spray head 80, the concentration of particles on the first transparent cover plate 21 is made to increase from the center to an edge.

During manufacturing of the projection screen shown in FIG. 8, the process S11 may include providing a transparent substrate thin film, forming the nanoparticle sol on a surface of the transparent substrate thin film, and arranging the transparent substrate thin film on a side of the first transparent cover plate.

The transparent substrate thin film is taken as the first transparent substrate 411, the nanoparticles 400 are formed on the first transparent substrate 411, and the first transparent substrate 411 may be bonded to the first transparent cover plate 21. The transparent substrate thin film is used as a carrier to manufacture the first nanoparticle layer 41, such that the first transparent cover plate 21 can be prevented from damage during manufacturing and the first nanoparticle layer 41 can be easily cut.

The nanoparticle sol may be formed on the surface of the transparent substrate thin film using the spray head. The spray head may be orientated toward the transparent substrate thin film, and the arrangement direction of the plurality of spray openings may be made parallel to a first lateral side of the transparent substrate thin film. The spray head is moved along a second lateral side of the transparent substrate thin film. During movement of the spray head, the spray head sprays the nanoparticle sol to the transparent substrate thin film with a moving speed being first increased and then decreased, such that the concentration of particles on the transparent substrate thin film may increase from the center to an edge.

Figure 14:
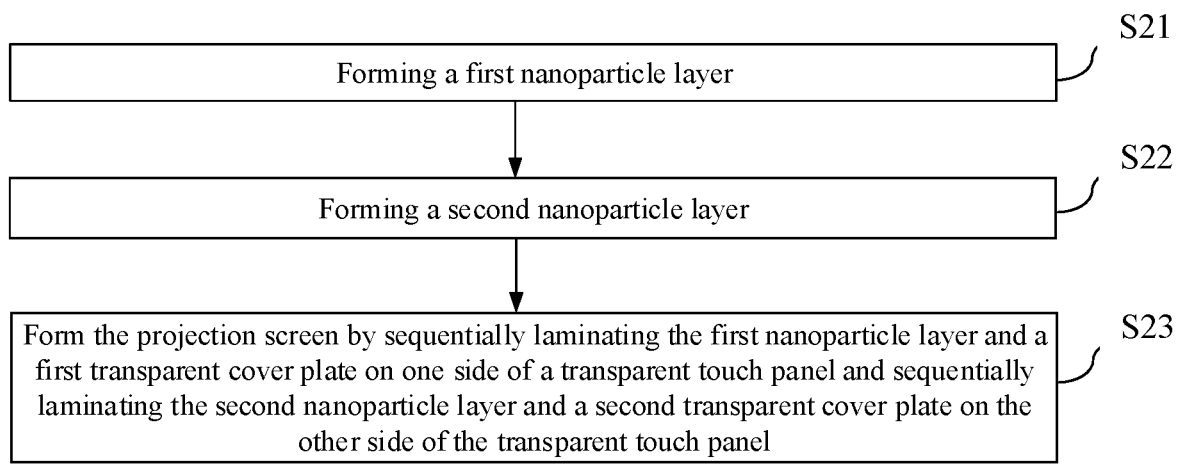
FIG. 14 is a flowchart of a method for manufacturing a projection screen according to an embodiment of the present disclosure.

FIG. 14 is a flowchart of a method for manufacturing a projection screen according to an embodiment of the present disclosure. The method is used to manufacture the projection screen shown in FIG. 3. As shown in FIG. 14, the manufacturing method includes the following processes.

In process S21, a first nanoparticle layer is formed.

The process S21 may be the same as the foregoing process S11. Details are not repeated herein.

In process S22, a second nanoparticle layer is formed.

For a method for forming the second nanoparticle layer, a reference may be made to the method for forming the first nanoparticle layer. Details are not repeated herein.

In process S23, a projection screen is formed by sequentially laminating the first nanoparticle layer and a first transparent cover plate on one side of a transparent touch panel and sequentially laminating the second nanoparticle layer and a second transparent cover plate on the other side of the transparent touch panel.

In the case that the projection screen receives light emitted by a projector, the nanoparticles of nanoscale sizes can scatter the light, and the wavelengths of the light scattered by the nanoparticles of different particle sizes are also different, such that light of different colors projected onto the projection screen by the projector can be scattered, and then the scattered light can enter the eyes of an observer. Therefore, the observer can perceive an image projected by the projector by receiving the light of various colors scattered by the nanoparticles.

Figure 15:
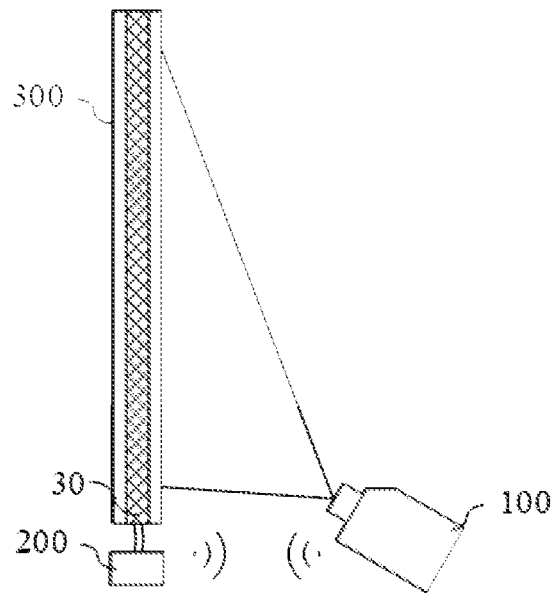
FIG. 15 is a schematic structural diagram of a projection display system according to an embodiment of the present disclosure.

FIG. 15 is a schematic structural diagram of a projection display system according to an embodiment of the present disclosure. As shown in FIG. 15, the projection display system includes a projector 100, a controller 200, and any one of the projection screens 300 shown in FIG. 2 to FIG. 11. The controller 200 is connected to a transparent touch panel 30 of the projection screen 300 and is connected to the projector 100. The controller 200 is configured to control the projector 100 based on a touch signal outputted by the transparent touch panel 30 to perform projection display.

The connection may be a communicative connection, which may include a wired connection and a wireless connection.

In the case that the projection screen receives light emitted by a projector, the nanoparticles of nanoscale sizes can scatter the light, and the wavelengths of the light scattered by the nanoparticles of different particle sizes are also different, such that light of different colors projected onto the projection screen by the projector can be scattered, and then the scattered light can enter the eyes of an observer. Therefore, the observer can perceive an image projected by the projector by receiving the light of various colors scattered by the nanoparticles.

The projector 100 may be a short throw projector or an ultra-short throw projector. According to a throw ratio, the projector 100 may be categorized as a short throw projector or an ultra-short throw projector. The throw ratio is a ratio of a projection distance to a picture width. The projection distance is a perpendicular distance from the projector 100 to the projection screen 300. To project pictures of the same width, the projection distance of the ultra-short throw projector is smaller than the projection distance of the short throw projector and the projection distance of the ultra-short throw projector usually ranges from several centimeters to more than ten centimeters. In the case that an ultra-short throw projector is used, the volume of the projection display system is smaller.

The throw ratio of the projector 100 may be not greater than 0.5, and the brightness may be not smaller than 2500 lm.

The projector 100 and the controller 200 may be connected by Wireless Fidelity (Wi-Fi), a cellular network, or a cloud. For example, the projector 100 may include a Wi-Fi module, and the projector 100 and the controller 200 are connected by Wi-Fi.

The controller 200 and the transparent touch panel 30 of the projection screen 300 may be connected by a flexible printed circuit (FPC).

Figure 16:
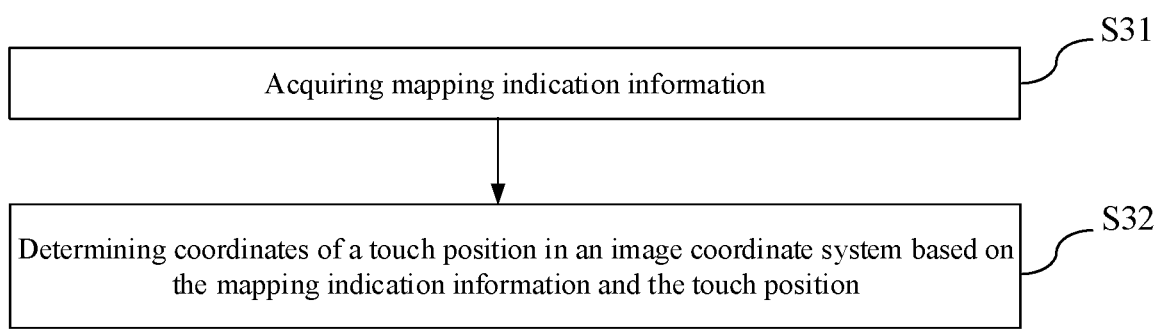
FIG. 16 is a flowchart of a projection display method according to an embodiment of the present disclosure.

FIG. 16 is a flowchart of a projection display method according to an embodiment of the present disclosure. The projection display method is applicable to the projection display system shown in FIG. 15. As shown in FIG. 16, the projection display method includes the following processes.

In process S31, mapping indication information is acquired.

The mapping indication information is configured to indicate a mapping relationship between a touch coordinate system and an image coordinate system.

In process S32, coordinates of a touch position in the image coordinate system are determined based on the mapping indication information and the touch position.

The touch coordinate system is a plane coordinate system established by taking the projection screen as a reference. Coordinates in the touch coordinate system are configured to indicate a position of a touch point on the projection screen.

The image coordinate system is a plane coordinate system established by taking an image provided by the controller to the projector as a reference. Coordinates in the image coordinate system are configured to indicate a position of a point in the image.

To enable the projection display system to accurately respond to a touch instruction, a specific mapping relationship is established between the touch coordinate system and the image coordinate system, such that in the case that an image is projected onto the projection screen, based on the coordinates of the touch point on the projection screen in the touch coordinate system and the mapping relationship, coordinates of a point, coinciding with the touch point, in the image projected onto the projection screen in the image coordinate system can be determined.

The mapping relationship between the touch coordinate system and the image coordinate system includes a first mapping relationship and a second mapping relationship. The first mapping relationship includes that the touch coordinate system coincides with the image coordinate system. The second mapping relationship includes that the vertical axis of the touch coordinate system coincides with the vertical axis of the image coordinate system, and the horizontal axis of the touch coordinate system is opposite in direction to the horizontal axis of the image coordinate system.

Figure 17:
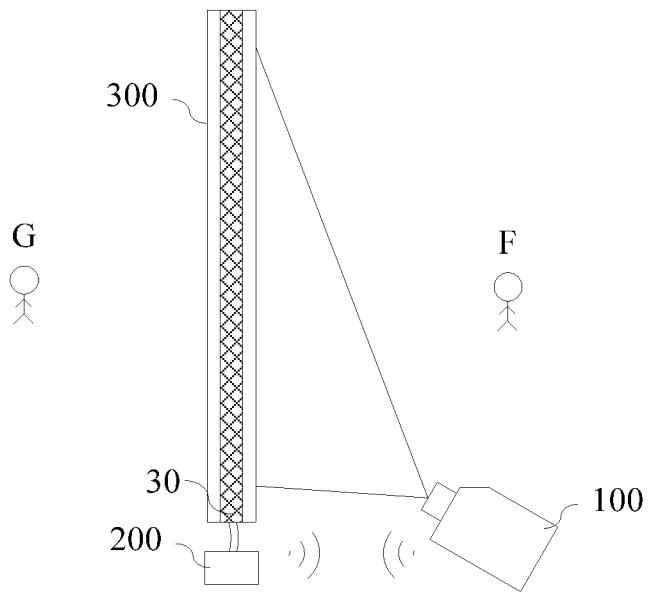
FIG. 17 is a schematic diagram of projection display according to an embodiment of the present disclosure.
Figure 18:
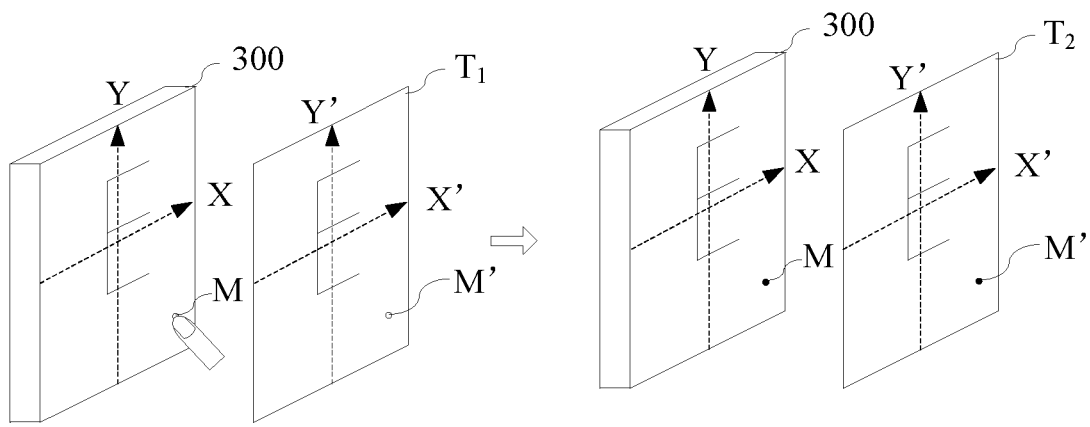
FIG. 18 is a schematic diagram of a process of projection display according to an embodiment of the present disclosure.

The projection display method is described by using an example in which an image is projected onto the projection screen and a user performs a write operation. During the write operation, the user taps a point in the image, and a corresponding point in the image turns from white into black. FIG. 17 is a schematic diagram of projection display according to an embodiment of the present disclosure. As shown in FIG. 17, a user F on a first side of the projection screen uses the projection display system to perform the projection display. During the projection display using the projection display system, the projection display system acquires mapping indication information, and determines the mapping relationship between the touch coordinate system and the image coordinate system based on the acquired mapping indication information. FIG. 18 is a schematic diagram of a process of projection display according to an embodiment of the present disclosure. As shown in FIG. 18, user F is on the first side of the projection screen, and the touch coordinate system coincides with the image coordinate system. The controller 200 provides an image $T_1$ to the projector 100. The projector 100 projects the image $T_1$ onto the projection screen 300. The image $T_1$ displays a capital letter E. During a writing process, the user taps on a point M in the image $T_1$ on the projection screen 300. The coordinates of the point M in the touch coordinate system are (m, n). Coordinate axes of the touch coordinate system coincide with coordinate axes of the image coordinate system. Therefore, based on the coordinates of the point M in the touch coordinate system, it may be determined that coordinates of a point M' which coincides with the point M in the case of being projected onto the projection screen 300, in the image $T_1$ in the image coordinate system are also (m, n). The projection display system responds to the tapping operation on point M by the user, the controller 200 provides an image $T_2$ to the projector 100, wherein a difference between the image $T_2$ and the image $T_1$ lies in that the point M' is black. The projector 100 projects the image $T_2$ onto the projection screen 300 for display. The point M' in the image $T_2$ coincides with the point M in the projection screen 300.

Figure 19:
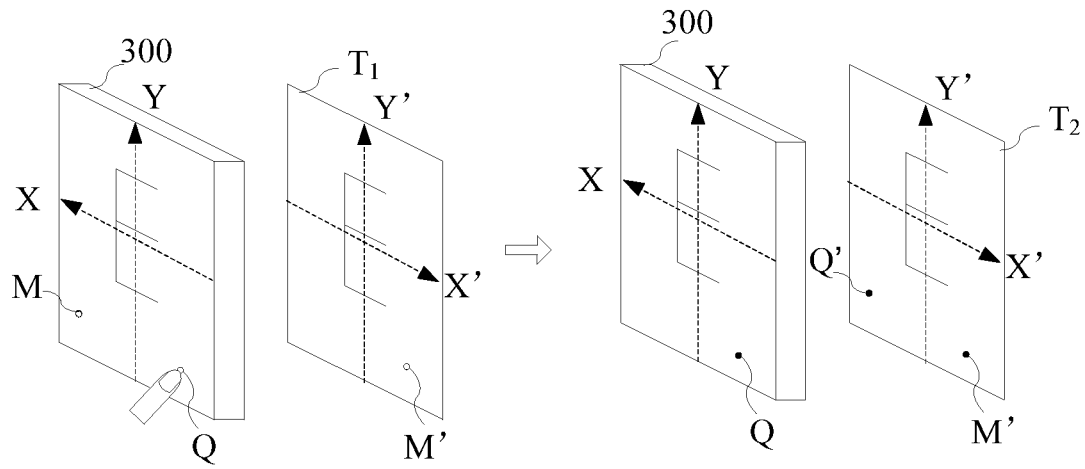
FIG. 19 is a schematic diagram of a process of projection display according to an embodiment of the present disclosure.

As shown in FIG. 17, a user G on a second side of the projection screen uses the projection display system to perform the projection display. During the projection display using the projection display system, the projection display system acquires mapping indication information and determines a mapping relationship between the touch coordinate system and the image coordinate system based on the acquired mapping indication information. FIG. 19 is a schematic diagram of a process of projection display according to an embodiment of the present disclosure. As shown in FIG. 19, the user G is on the second side of the projection screen, and the vertical axis of the touch coordinate system coincides with the vertical axis of the image coordinate system, and the horizontal axis of the touch coordinate system is opposite in direction to the horizontal axis of the image coordinate system. The controller 200 still provides the image $T_1$ to the projector 100, and the projector 100 projects the image $T_1$ onto the projection screen 300. To enable the projection screen 300 to display the image $T_2$, the user G taps on a point Q in the image $T_1$ on the projection screen 300. The coordinates of the point Q in the touch coordinate system are (–m, n). That is, point Q and point M are symmetric about the vertical axis of the touch coordinate system. The vertical axis of the touch coordinate system coincides with the vertical axis of the image coordinate system, and the horizontal axis of the touch coordinate system is opposite in direction to the horizontal axis of the image coordinate system. Therefore, based on the coordinates of the point Q in the touch coordinate system, it may be determined that coordinates of a point M' in the image $T_1$ which coincides with the point Q in the case of being projected onto the projection screen 300, in the image coordinate system are (m, n). The projection display system responds to the tapping operation on the point Q by the user, and the controller 200 provides the image $T_2$ to the projector 100, wherein a difference between the image $T_2$ and the image $T_1$ lies in that the point M' is black. The projector 100 projects the image $T_2$ onto the projection screen 300 for display. The point M' in the image $T_2$ coincides with the point Q in the projection screen 300.

Optionally, acquiring the mapping indication information may include receiving a user instruction, and acquiring the mapping indication information based on the user instruction.

Illustratively, the user instruction may be transmitted by triggering an operation button. The operation button may be triggered by the user. The user may trigger the operation button based on a relative position between himself/herself and the projection screen, such that a corresponding instruction can be transmitted. Or, an instruction may be transmitted through the foregoing remote control.

Figure 20:
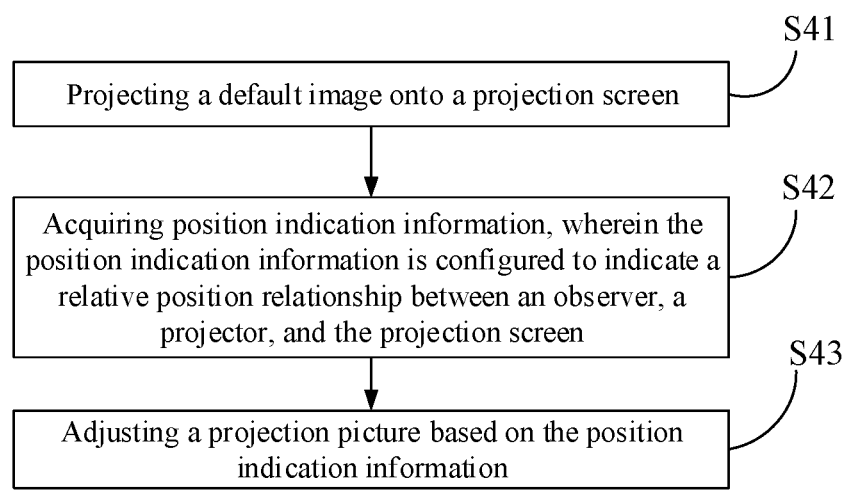
FIG. 20 is a flowchart of a projection display method according to an embodiment of the present disclosure.

FIG. 20 is a flowchart of a projection display method according to an embodiment of the present disclosure. The method is used for adjustment upon the projection display system being powered on. As shown in FIG. 20, the method includes the following processes.

In process S41, a default image is projected onto a projection screen.

The default image may be a splash image of the projection display system.

In process S42, position indication information is acquired. The position indication information is configured to indicate a relative position relationship between an observer, a projector, and the projection screen.

In process S43, a projection picture is adjusted based on the position indication information.

Figure 21:
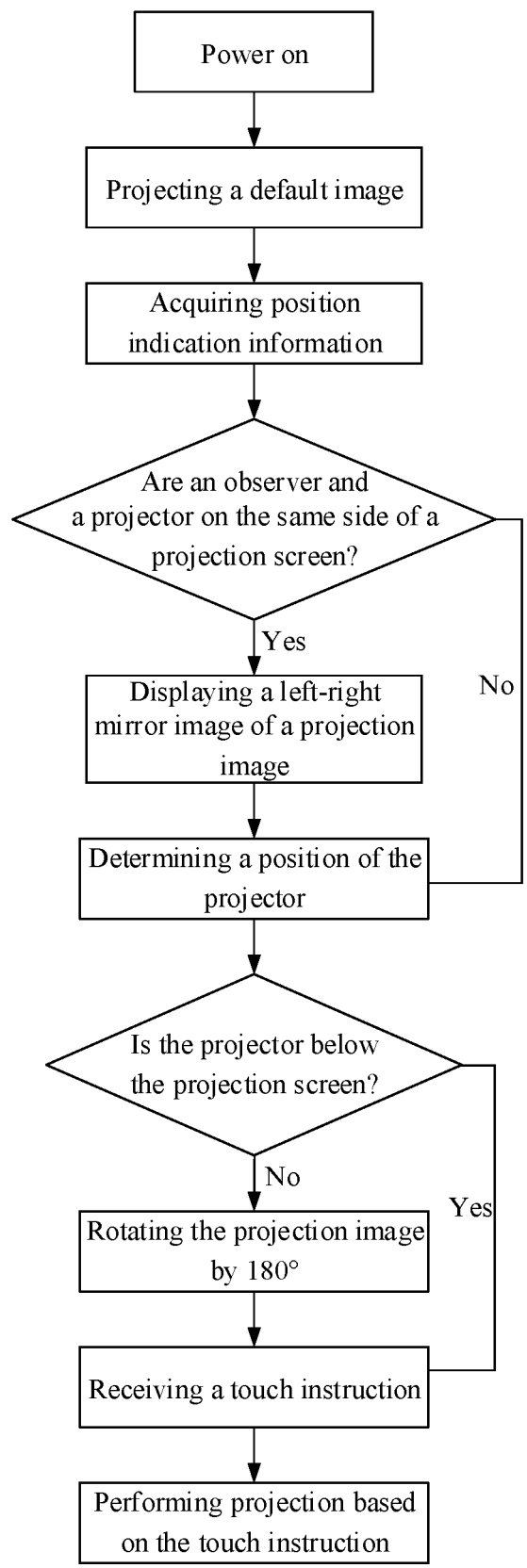
FIG. 21 is an operational flowchart of a projection display system according to an embodiment of the present disclosure.

FIG. 21 is an operational flowchart of a projection display system according to an embodiment of the present disclosure. As shown in FIG. 21, for example, in the case that the projection display system is powered on, a projector first projects a default image onto a projection screen.

Position indication information is then acquired. The position indication information is configured to indicate a relative position relationship between an observer, a projector, and the projection screen. The observer and the projector may be on the same side of the projection screen or may be on two sides of the projection screen.

In the case that the observer and the projector are on the same side of the projection screen, a default image currently projected is kept. In the case that the observer and the projector are on two sides of the projection screen, the default image is mirror-reversed for display. That is, the default image is reversed right to left and then projected onto the projection screen.

A position of the projector is then determined. In the case that the projector is below the projection screen, a default image currently projected is kept. In the case that the projector is above the projection screen, the default image is rotated by 180° for display and then projected onto the projection screen.

A touch instruction is received, and coordinates of a touch position in the image coordinate system are determined based on the indication information and the touch position.

The foregoing descriptions are merely optional embodiments of the present disclosure but not intended to limit the present disclosure. Any changes, equivalent replacements, and improvements made within the concept and principle of the present disclosure fall within the protection scope of the present disclosure.

What is claimed is:

1. A projection screen, comprising a first transparent cover plate, a transparent touch panel, and a first nanoparticle layer, wherein the first nanoparticle layer and the first transparent cover plate are sequentially laminated on one side of the transparent touch panel, and the first nanoparticle layer comprises a plurality of dispersed nanoparticles of different particle sizes; and further comprising a second transparent cover plate and a second nanoparticle layer, wherein the second nanoparticle layer and the second transparent cover plate are sequentially laminated on the other side of the transparent touch panel, and the second nanoparticle layer comprises a plurality of dispersed nanoparticles of different particle sizes.

2. The projection screen according to claim 1, wherein distributions of nanoparticles of same particle sizes in the first nanoparticle layer and the second nanoparticle layer are same.

3. The projection screen according to claim 2, wherein a total particle concentration of the nanoparticles in the first nanoparticle layer progressively increases from a center to an edge of the projection screen.

4. The projection screen according to claim 3, wherein the total particle concentration of the nanoparticles in the first nanoparticle layer ranges from $5*10^8/cm^2$ to $5*10^9/cm^2$.

5. The projection screen according to claim 1, wherein the nanoparticles meet at least one of the following limitations:
   each of the nanoparticles comprises an inner core and an outer shell covering the inner core, wherein the inner core and the outer shell are made of different materials; or
   the nanoparticles are $ZnO$, $Al_2O_3$, or $TiO_2$ nanoparticles.

6. The projection screen according to claim 5, wherein the inner core is made of Si, the outer shell is made of Ag, and the nanoparticles of different particle sizes are different in terms of at least one of a thickness of the outer shell and a diameter of the inner core.

7. The projection screen according to claim 1, wherein the particle sizes of the nanoparticles are not greater than 100 nm.

8. The projection screen according to claim 1, wherein
   the first nanoparticle layer further comprises a first transparent substrate, wherein the nanoparticles on the one side of the transparent touch panel are disposed on a surface of the first transparent substrate; and
   the second nanoparticle layer further comprises a second transparent substrate, wherein the nanoparticles on the other side of the transparent touch panel are disposed on a surface of the second transparent substrate.

9. The projection screen according to claim 8, wherein the first transparent cover plate, the first nanoparticle layer, the transparent touch panel, the second nanoparticle layer, and the second transparent cover plate are bonded by a transparent adhesive.

10. The projection screen according to claim 1, wherein the transparent touch panel comprises a transparent substrate and a touch electrode pattern disposed on the transparent substrate; wherein
   the touch electrode pattern comprises a plurality of touch driving electrodes, a plurality of touch sensing electrodes, and a touch signal line, wherein the touch driving electrodes and the touch sensing electrodes are intersected with each other, intersections of the touch driving electrodes and the touch sensing electrodes are spaced apart by a touch insulating layer, each of the touch driving electrodes is connected to one touch signal line, and each of the touch sensing electrodes is connected to one touch signal line; or
   the touch electrode pattern comprises the touch signal line and a plurality of touch detection electrodes arranged in an array, wherein each of the touch detection electrodes is connected to one touch signal line.

11. The projection screen according to claim 10, wherein the touch electrode pattern is disposed on a side, proximal to the first transparent cover plate, of the transparent substrate, and a thickness of the second transparent cover plate is less than a thickness of the first transparent cover plate.

12. The projection screen according to claim 11, wherein the thickness of the first transparent cover plate and the thickness of the second transparent cover plate meet at least one of the following limitations:
   the thickness of the first transparent cover plate is equal to a sum of the thickness of the second transparent cover plate and a thickness of the transparent substrate; or
   the thickness of the first transparent cover plate ranges from 1 mm to 1.5 mm, and the thickness of the second transparent cover plate ranges from 1 mm to 1.5 mm.

13. The projection screen according to claim 1, wherein a thickness of the projection screen is not greater than 5 mm.

14. A projection display system, comprising a projector, a controller, and a projection screen, wherein the controller is connected to a transparent touch panel of the projection screen and is connected to the projector, the controller is configured to control the projector based on a touch signal outputted by the transparent touch panel to perform projection display, and the projection screen comprises a first transparent cover plate, a transparent touch panel, and a first nanoparticle layer, wherein the first nanoparticle layer and the first transparent cover plate are sequentially laminated on one side of the transparent touch panel, and the first nanoparticle layer comprises a plurality of dispersed nanoparticles of different particle sizes; and
   wherein the projection screen further comprises a second transparent cover plate and a second nanoparticle layer, the second nanoparticle layer and the second transparent cover plate are sequentially laminated on the other side of the transparent touch panel, and the second nanoparticle layer comprises a plurality of dispersed nanoparticles of different particle sizes.

15. A method for manufacturing a projection screen, comprising:
   forming a first nanoparticle layer, wherein the first nanoparticle layer comprises a plurality of dispersed nanoparticles of different particle sizes; and
   forming the projection screen by sequentially laminating the first nanoparticle layer and a first transparent cover plate on one side of a transparent touch panel; and
   wherein the projection screen further comprises a second transparent cover plate and a second nanoparticle layer, the second nanoparticle layer and the second transparent cover plate are sequentially laminated on the other side of the transparent touch panel, and the second nanoparticle layer comprises a plurality of dispersed nanoparticles of different particle sizes.

16. The method according to claim 15, wherein
   forming the first nanoparticle layer comprises:
     forming a nanoparticle sol on a surface of the first transparent cover plate; or
   forming the first nanoparticle layer comprises:
     providing a transparent substrate thin film;
     forming the nanoparticle sol on a surface of the transparent substrate thin film; and
     arranging the transparent substrate thin film on a side of the first transparent cover plate.

17. The method according to claim 16, wherein the method meets at least one of the following limitations:
   forming the nanoparticle sol on the surface of the first transparent cover plate comprises:
     orientating a spray head toward the first transparent cover plate, wherein the spray head is provided with a plurality of spray openings, wherein a distribution density of the plurality of spray openings progressively increases from a middle position to positions of two ends along an arrangement direction of the plurality of spray openings or sizes of the plurality of spray openings progressively increase from the middle position to the positions of the two ends along the arrangement direction of the plurality of spray openings, and making the arrangement direction of the plurality of spray openings parallel to a first lateral side of the first transparent cover plate; and relatively moving the spray head along a second lateral side of the first transparent cover plate, wherein during movement, the spray head sprays the nanoparticle sol to the first transparent cover plate with a moving speed being first increased and then decreased; or forming the nanoparticle sol on the surface of the transparent substrate thin film comprises:

orientating the spray head toward the transparent substrate thin film, wherein the spray head is provided with a plurality of spray openings, wherein the distribution density of the plurality of spray openings progressively increases from the middle position to positions of two ends along the arrangement direction of the plurality of spray openings or sizes of the plurality of spray openings progressively increase from the middle position to positions of two ends along the arrangement direction of the plurality of spray openings, and making the arrangement direction of the plurality of spray openings parallel to a first lateral side of the transparent substrate thin film; and moving the spray head along a second lateral side of the transparent substrate thin film, wherein during movement of the spray head, the spray head sprays the nanoparticle sol to the transparent substrate thin film with a moving speed being first increased and then decreased.

18. A projection display method, applicable to the projection display system as defined in claim 14, the method comprises:

acquiring mapping indication information, wherein the mapping indication information is configured to indicate a mapping relationship between a touch coordinate system and an image coordinate system; and determining coordinates of a touch position in the image coordinate system based on the mapping indication information and the touch position.

19. The method according to claim 18, wherein prior to acquiring the mapping indication information, the method further comprises:

projecting a default image onto a projection screen;

acquiring position indication information, wherein the position indication information is configured to indicate a relative position relationship between an observer, a projector, and the projection screen; and adjusting a projection image based on the position indication information.

* * * * *